United States Patent Office 3,376,103
Patented Apr. 2, 1968

3,376,103
PROCESS FOR ROASTING VANADIUM ORES
Angus V. Henrickson and John A. Hermann, Golden, and Adolph E. Meyer, Wheatridge, Colo., assignors to Kerr-McGee Corporation, a corporation of Delaware
No Drawing. Filed Mar. 9, 1964, Ser. No. 350,573
20 Claims. (Cl. 23—15)

ABSTRACT OF THE DISCLOSURE

Vanadium values are recovered from vanadium bearing ores by a novel process including a plurality of roasting stages in the presence of at least one substantially neutral salt of an alkali metal selected from the group consisting of sodium and potassium and a strong mineral acid. The ore is roasted under oxidizing conditions until the vanadium values are solubilized, and then the roasted ore is leached with an aqueous medium to produce an aqueous leach liquor containing the solubilized vanadium values. Thereafter, the vanadium values are recovered from the leach liquor.

---

This invention broadly relates to the recovery of vanadium values from vanadium bearing materials. In one of its more specific aspects, the invention further relates to an improved process for roasting vanadium bearing materials.

The invention will be described and illustrated hereinafter with specific reference to a process for recovering vanadium values from vanadium bearing ferrophosphorus. However, it is understood that the invention may be useful in the recovery of vanadium from other vanadium bearing ores or materials.

Ferrophosphorus usually contains extraneous metal values such as vanadium, chromium, titanium, nickel and manganese. For instance, an average analysis for one ferrophosphorus of commerce is 27.5% phosphorus, 7.07% vanadium, 4.67% chromium, 1.23% titanium, 1.36% nickel, 0.2% manganese, 0.4% silicon and the remainder iron. Ferrophosphorus is available in large quantities at low cost, and it would be a convenient source material for relatively expensive vanadium provided an economic process for obtaining the vanadium in high purity were available.

Ferrophosphorus is a reduced product and it is necessary to subject it to an oxidizing roast in order to oxidize the vanadium values to a water-soluble state. As is well known, large quantities of contaminating substances such as phosphorus are rendered soluble by conventional roasting procedures in instances where the roast is sufficiently vigorous to result in the solubilization of vanadium values and the contaminants appear in the leach solution and in turn in the vanadium product precipitated therefrom. Phosphorus is an extremely deleterious contaminant and a vanadium concentrate is rendered useless as a commercial vanadium product in instances where the phosphorus exceeds more than about 0.05%. It is therefore obvious that the control of phosphorus solubilization during the roast is very important.

In accordance with the prior art processes, ferrophosphorus was roasted for a sufficient period of time to solubilize the vanadium with an alkaline alkali salt such as sodium carbonate or sodium hydroxide as an essential constituent of the roast. However, under these conditions the solubilization of the vanadium also resulted in the solubilization of other substances present in the ferrophosphorus, such as large amounts of phosphorus, chromium, etc., and it was difficult to recover the vanadium values in sufficient purity for sale as a high purity commercial product. In instances where a neutral alkali metal salt was attempted to be used in the roasting of ferrophosphorus such as sodium chloride, the vanadium was not sufficiently solubilized to enable the vanadium values to be recovered in economic yields, and the vanadium was largely retained in the ferrophosphorus upon leaching the roast.

In accordance with the present invention, it is possible to roast the ferrophosphorus and oxidize the vanadium values to a soluble state while controlling the solubilization of phosphorus at a practical level. As a result, the roast may be leached with an aqueous leaching medium to thereby provide a vanadium bearing leach liquor which contains a sufficiently high ratio of vanadium values to phosphorus values to allow the recovery of a vanadium product of commerce of high purity without having to resort to uneconomic practices. The invention also provides improved processes for cooling the ferrophosphorus during the roast to control the roasting temperature, and for quenching the roast so as to assure faster percolation leaching than was practical heretofore. Thus, the invention provides for the first time an entirely satisfactory process for solubilizing and recovering vanadium values contained in vanadium bearing materials such as ferrophosphorus.

It is an object of the present invention to provide an improved process for roasting vanadium bearing materials and for recovering vanadium values from the roasted material.

It is still a further object to provide an improved process for roasting vanadium bearing ferrophosphorus and for recovering vanadium values from the roasted ferrophosphorus.

It is still a further object to provide an improved process for maintaining a desired roasting temperature in the roasting of ferrophosphorus and other vanadium bearing materials.

It is still a further object to provide an improved process for quenching roasted vanadium bearing materials such as ferrophosphorus whereby the quenched roast may be percolation leached at fast flow rates to dissolve and recover in the leach liquor substantially all of the vanadium values present in the ore.

It is still a further object to provide an improved process for reducing the amount of phosphorus solubilized during the roasting of vanadium bearing materials such as ferrophosphorus.

Still other objects and advantages of the invention will be apparent to those skilled in the art upon reference to the following detailed description and the examples.

In accordance with one important aspect of the present invention, it has been discovered that if a vanadium bearing ore such as ferrophosphorus is roasted under oxidizing conditions over a plurality of roasting stages in the presence of a substantially neutral alkali metal salt, the vanadium values are solubilized and may be recovered in high yield and the solubilization of phosphorus and other undesirable impurities is controlled within practical limits.

The ferrophosphorus or other ore as received usually is in the form of lumps of substantial size and it should be ground to a fine particle size prior to roasting. Usually, it is preferred that the ferrophosphorus be reduced to a particle size of about −48 to −400 mesh, or to about −100 to −150 mesh or finer for better results from the standpoint of roasting. In many instances, a particle size of about −48 to −84 mesh is satisfactory and presents fewer handling problems. One preferred method of reducing the ore to the ultimate particle size is by means of a hammer mill.

The alkali metal salt to be roasted with the ferrophosphorus may be added to the ore at a suitable stage. Preferably, the salt as about −30 mesh material is added to the ore following reduction to the ultimate particle size such as −100 mesh.

The mixture of ore and alkali metal salt may be subjected to an oxidizing primary roast at a temperature sufficiently low to prevent melting of the ferrophosphorus or a large amount of sintering. For best results, the primary roast is conducted in the presence of an oxidizing elemental oxygen-containing gas such as air at a temperature of approximately 650–750° C. The roast may be conducted over a period of approximately 1 to 4 hours, although longer or shorter times may be effective in some instances depending upon the nature of the ore such as from 30 minutes to 8 hours. Thereafter, the hot primary roast may be cooled to a temperature sufficiently low for the ore to be crushed as it agglomerates to some extent during the roast. The cooling or quenching step may be accomplished by allowing the hot roast to cool in air at ambient temperature, air or steam may be passed over the hot roast, or it may be sprayed with sufficient water to allow cooling without actually immersing in water. The hot roast may be quenched by submersing in water but this is not usually desired.

The cooled ore may be crushed or ground to a particle size not greater than about −3 mesh and preferably not greater than −10 mesh, or to a smaller particle size such as about −48 to −400 mesh. Also, an additional quantity of the alkali metal salt may be added and mixed with the ore, and preferably prior to crushing so that the salt it intimately mixed throughout the ore and ground therewith to provide a fine particle size. For best results, the ore should be at a temperature not greater than about 100–200° C. during the crushing step following the primary roast. In some instances, all of the alkali metal salt may be added prior to the primary roast and a further addition prior to the secondary roast is not necessary.

The ferrophosphorus ore from the primary roast, and in the presence of the alkali metal salt, may be subjected to a secondary roast under oxidizing conditions at a temperature of approximately 600–800° C. The secondary roast may be conducted in the presence of an elemental oxygen-containing gas such as air over a period of approximately 1 to 4 hours, but longer or shorter periods may be satisfactory such as about 30 minutes to 8 hours. The ore may be air or steam cooled following the secondary roast, or it may be quenched by means of a water spray wherein water is sprayed on the ore in sufficient quantities to reduce its temperature without immersing the roasted ore in a pool of water. The hot roasted ore may be quenched by immersing in water so as to fracture the agglomerates but this is not necessary and usually is not preferred when a percolation leaching step is used for leaching the vanadium values from the roasted ore.

In instances where the ore is to be percolation leached, the hot secondary roast is air or steam cooled, or sprayed with a controlled amount of water which is preferably insufficient to permanently wet the ore to thereby reduce the temperature to a value not greater than about 100–200° C. Thereafter, the cooled roasted ore is percolation leached with water to thereby produce a leach solution containing the solubilized vanadium values and greatly reduced amounts of phosphorus and other undesirable impurities.

Prior art agitation leaching with water may be used when this is desirable for recovering the solubilized vanadium from the roast, and only about one to two hours of agitation leaching is necessary in most instances. The leach liquor from an agitation leach usually is not as clear as that obtained with percolation leaching and clarification may be necessary in some instances.

In instances where a percolation leach is practiced, it is preferably conducted in a plurality of leach vessels with the aqueous leach liquor advancing over at least three-four stages to thereby produce a very concentrated leach liquor. Usually only one-two tons or less of water per ton of roasted ore is necessary for leaching and there is no need for clarifiers, thickeners, etc. in most instances.

When the preferred quench procedure of the invention is used in combination with percolation leaching, it is possible to obtain flow rates of 100–200 gallons per square foot per day or higher. Usually, the flow of leach liquor through the ore in the preferred percolation leach process is restricted to provide a total residence time upon advancing through four leach cycles or stages of approximately one day and thereby assure extraction of almost the entire solubilized vanadium content of the ore. It is preferred that a submerged leach be conducted, although a trickle leach of the ore is possible. The particle size of the roast averages about one-half inch in diameter when the preferred quenching process is effected, and the agglomerates are porous and cellular. As a result, particle size is not important and much larger particles than one-half inch may be leached when this is desirable, or smaller particles down to the point where they become sufficiently small to restrict the flow of the leach liquor.

The amount of alkali metal salt which is added to the ore may be varied over wide ranges. In most instances and especially when the ore is ferrophosphorus, it is preferred that the total amount of alkali metal salt which is added be approximately 0.35 to 2 parts by weight for each part by weight of ore. For best results, it is usually preferred that all of the salt be added prior to the primary roast, but if desired the alkali metal salt may also be added in two stages with about 5–95% of the salt being added prior to the primary roast and approximately 95–5% being added prior to the secondary roast. When the ferrophosphorus contains about 7% vanadium, then a total of about 0.7 part by weight of the alkali metal salt per part by weight of ferrophosphorus is used for best results although this may vary somewhat when the vanadium content of the ferrophosphorus varies. For instance, when sodium chloride is used as the alkali metal salt it is preferred that the weight ratio of sodium chloride to vanadium vary between 5:1 and 2:1, and preferably is about 10:1.

The nature of the alkali metal salt which may be used in practicing thep resent invention is of importance. For instance, an amount effective to solubilize phosphorus of alkaline alkali metal salts such as the alkali metal carbonates, hydroxides, etc. should not be used, and only substantially neutral alkali metal salts are satisfactory. The preferred alkali metals are sodium and potassium, and the salts are usually substantially neutral salts of strong mineral acids such as sulfates, halides including chlorides, etc. Sodium chloride is much preferred.

It is very desirable that the ore be reduced to a fine particle size in instances where a maximum recovery of the vanadium is desired. Usually, for a commercial process it is preferred that the particle size be not greater than −48 mesh and preferably not greater than −84 mesh, or for best results −80 to −100 mesh or finer, at the time of first subjecting the ore to the primary roast. Also, for best results the added alkali metal salt should be intimately and uniformly mixed with the finely divided ore. It is also very desirable that the agglomerated ore from the primary roast be subjected to a crushing or grinding step prior to the secondary roast to assure that the interior of the agglomerates is subjected to an oxidizing roast in the presence of an additional quantity of the alkali metal salt. Otherwise, maximum recovery of vanadium is not obtained in most instances.

Ferrophosphorus is a reduced product and it is essential that it be subjected to an oxidizing roast. In most instances, air is passed over the ore during the roast in quantities sufficient to assure an oxidizing atmosphere. This also has the desirable effect of cooling the highly exothermic reactants and air at ambient temperature may be supplied in a volume sufficient to assure that the desired temperature range is maintained. In such instances, a much larger quantity of air is supplied than is normally necessary to assure an oxidizing atmosphere.

The use of air in excess for cooling purposes may be undesirable in instances where the alkali metal salt is a chloride and it is desired to recover a maximum amount of gaseous hydrochloric acid from the roaster gasses. It has been discovered that excess elemental oxygen and low moisture content in the roaster gases reduce the hydrochloric acid content and thus are detrimental to the percent yield of hydrochloric acid. In one important variant of the invention water may be sprayed or added by other suitable method to the roasting ore during at least a portion of the roasting cycle. The added water cools the ore and thereby aids in maintaining the desired temperature range and this is especially desirable during the highly exothermic stages of the roast. The added water also reduces the free chlorine content and assures a maximum content of hydrochloric acid in the roaster gases and the yield of gaseous hydrochloric acid may be increased substantially. Addtionally, less cooling air is needed to maintain the desired temperature range and the volume of gases withdrawn from the roasters is much less and may be scrubbed for recovery of gaseous hydrochloric acid and other constituents such as vanadium values much easier. The water may be added at the rate of about 0.1–2 pounds per pound of ore and preferably 0.5–1.5 pounds per pound of ore.

In still another important variant of the invention, magnesium oxide and/or calcium oxide, or magnesium or calcium salts which are capable of yielding these substances in the roaster, may be added to the ore at some stage prior to a roasting step to further reduce the amount of phosphorus in the leach liquor. Only a small amount of these substances should be added, such as up to 0.1 pound of magnesium or calcium oxide or the equivalent per pound of ore. It is preferred that the magnesium oxide or calcium oxide be added prior to the second roast in most instances, although it may have some beneficial effect when added prior to the first roast. In some instances, better results may be obtained by adding small amounts to both the primary and secondary roasts.

The time periods for the primary and secondary roasts may vary over wide ranges. However, it is preferred that the primary roast be conducted for such a period of time as is required to assure a pH value of not less than 3.3 and, for better results, a pH value of 5.5 or higher upon quenching or leaching a portion of the crushed roasted ore in water. Normally, the primary roast is yellow to brownish yellow in color at this stage, and the pH value of the quench or leach water will be greater than 3.3, and preferably greater than 5.5 with no ferrous iron or substantially no ferrous iron being present in the roast. Even better results are obtained when the pH value is at least 6.0, and best results at pH values of about 6.6 to 6.9 or higher. In carrying out this test, it is necessary that the ferrophosphorus from the primary roast be sufficiently finely divided to assure that the quenching or leaching water reaches the interior of the particles as otherwise a true test is not obtained. The secondary roast should be conducted for such a period of time as is necessary to provide a pH of at least 6.5 to 7.0 or higher in a small amount of water used to quench or leach a portion of the crushed roasted ore, and best results are obtained when the pH is 7.5 to 8.0 or higher. When the primary and secondary roasts are conducted as described above, then a maximum amount of the vanadium is solubilized and a minimum amount of undesirable impurities such as phosphorus.

In some instances, it is desirable to conduct at least a portion of the roast under conditions where added water is not present in the roaster gases in contact with the ore. This seems to aid in the solubilization of a maximum amount of vanadium.

The vanadium values present in the leach liquor obtained upon leaching ferrophosphorus roasted in accordance with the present invention may be recovered by any convenient prior art procedure. While not limited thereto, one very satisfactory method of recovering the vanadium values as a commercial product involves precipitating ammonium metavanadate from the leach liquor by addition of ammonium chloride. The resultant impure ammonium metavanadate may be purified by digestion in the presence of a small amount of base such as sodium hydroxide or carbonate, and then reprecipitating ammonium metavanadate from the resultant solution by addition of a further quantity of ammonium chloride. The purified ammonium metavanadate may be dried, decomposed by heating to vanadium pentoxide, which in turn may be fused to black cake. The above procedure for recovering the vanadium values as a commercial vanadium product is only exemplary, and numerous other methods are well known to the art and may be used.

The foregoing detailed description and the following specific examples are for purposes of illustration only and are not intended as being limiting to the spirit or scope of the appended claims.

*Example I*

Ferrophosphorus containing 27.5% P, 7.07% V, 4.67% Cr, 1.23% Ti, 1.36% Ni, 0.2% Mn, 0.4% Si and the remainder Fe, by weight, and having a particle size of approximately 2 to 3 inches was fed to a gyratory where the particle size was reduced to about 1½ inches. The gyratory discharge was fed to a standard cone crusher which in turn discharged material to a vibrating screen fitted with a ¼-inch aperture screen. The screen oversize was fed to a Pennsylvania impactor where it was reduced to a size passing the screen, and the screen undersize, ¼-inch material, was used as ball mill feed. Further grinding was in a Hardinge airswept mill using a 270 M screen specification as a control. A screen analysis of the output indicated that the −270 M fraction was about 75% and the +150 M fraction was about 8%. Sodium chloride in an amount of 0.5 pound per pound of ferrophosphorus was mixed with the output from the Hardinge mill and the mixture passed to a rod mill where it was gound to −100 mesh.

The mixture of ground ore and salt was fed to a primary roaster and subjected to a primary oxidizing roast at a temperature of 650–725° C. until a sample of the roasted ore when crushed and immersed in a small amount of water resulted in a pH value of 6.5 in the water. This required a roast of about four hours. Then, the calcine was cooled from the roasting temperature to 100° C. by passing air at ambient temperature thereover. It was also found that a satisfactory and more rapid quench could be achieved by spraying droplets or a mist of water on the hot roasted ore in quantities sufficient to cool the ore without immersing it in liquid water.

The cooled ore from the primary roaster was ground to −100 mesh in a ball mill. Prior to feeding the ore to the ball mill, 0.25 lb. of sodium chloride per pound of ferrophosphorus was added and the mixture fed to the ball mill for the purpose of assuring a desired particle size and thorough mixing of the salt with the roasted ore.

The output from the ball mill was fed to a secondary roaster and subjected to a secondary oxidizing roast at a temperature of 650–725° C. The secondary roast was continued for a period of time sufficient to result in a pH of 8 when a sample of the calcine was crushed and quenched in a small amount of water. The secondary roast required about three hours. In both the primary and secondary roasts an oxidizing atmosphere was provided and the ore was cooled during the exothermic reaction by passing excess air at ambient temperature over the roasting ore.

The hot calcine from the secondary roaster was cooled to below 100° C. by passing air thereover. It was also found that it was possible to spray droplets or a mist of water on the hot ore and thereby achieve a faster rate of cooling without adversely affecting the particle size of the roasted ore. When the ore was thus cooled, the particle size was substantially the same as that of the hot roasted ore leaving the secondary roaster.

Four vats arranged in series were filled with the cooled ore from the secondary roaster and then the ore was percolation leached with water using about one ton of water per ton of ore. The leach liquor was advanced through the four vats in series at a rate sufficient to assure contact with the ore over a 24 hour period. Also, the process was operated continuously with a fresh vat of ore being placed on stream in contact with the most concentrated leach liquor when the first vat in the series was completely leached.

Roasting and percolation leaching in accordance with this example resulted in the solubilization of 91–92% of the original vanadium content of the ferrophosphorus and the recovery of substantially all of the solubilized vanadium. It was not necessary to crush the roasted ore to a smaller particle size to achieve as complete a recovery as would have been possible with agitation leaching of crushed roasted ore.

The leach liquor contains approximately 50 g./l. of $V_2O_5$, 20 g./l. of $P_2O_5$, 0.5 g./l. of chromium, 25 g./l. of chloride ion and 50 g./l. of sodium ion. The vanadium values were recovered by precipitation with excess ammonium chloride to produce a crude ammonium metavanadate product which was purified by dissolving in a slight excess of sodium carbonate, the solution filtered, and ammonium metavanadate re-precipitated in the pure form by addition of excess ammonium chloride. The pure ammonium metavanadate was decomposed by heating to an elevated temperature to produce vanadium pentoxide, which was fused to black cake. The black cake contained more than 98% $V_2O_5$, less than 0.05% phosphorus, less than 0.02% sulfur, less than 0.5% sodium and potassium oxide, less than 0.02% arsenic, less than 0.5% silica and less than 0.5% iron. Thus, it met all specifications for the commercial product and it was not necessary to resort to a more involved upgrading.

*Example II*

The procedure of Example I was followed with the exception of adding 0.03 pound of calcium oxide for each pound of ferrophosphorus prior to passing the roasted ore from the primary roast to the ball mill. Thus, the added calcium oxide was present in the ferrophosphorus at the time of the secondary roast.

The leach liquor resulting from leaching the output from the secondary roaster contained a noticeably smaller amount of phosphorus and the crude ammonium metavanadate also was of much higher purity. It was possible to purify the crude ammonium metavanadate precipitate sufficiently by digesting it in a small amount of sodium carbonate and complete solution was not necessary for purification purposes. After a short digestion period, excess ammonium chloride was added without filtration to re-precipitate the vanadium content as ammonium metavanadate. The ammonium metavanadate was recovered, decomposed by heating and fused to black cake as in Example I. This procedure produced a satisfactory vanadium product which met all commercial specifications without the necessity for further upgrading.

*Example III*

The procedure of Example I was followed except as noted below.

In the procedure of Example I, sufficient cooling air was supplied to the roasters to provide the desired temperature range during the exothermic portion of the roast. This resulted in a large volume of gases exiting from the primary roaster. It was difficult to adequately scrub the large volume of roaster gases free of the gaseous hydrochloric acid.

About 1.0–1.5 lbs. of water for each pound of ferrophosphorus is sprayed on the ore on the first two trays of the roaster and it results in adequate cooling when sufficient atmospheric air is supplied thereto to result in an oxidizing atmosphere. This reduced the output of gases from the roaster to a level whereby it was easy to scrub the gaseous hydrochloric acid content without any difficulty. Also, unexpectedly there is a sharp increase in the total amount of hydrochloric acid in the roaster gases. Thus, this procedure enables the preparation of additional hydrochloric acid which may be utilized for the preparation of ammonium chloride for the precipitation of ammonium metavanadate.

What is claimed is:

1. A process for recovering vanadium values from vanadium bearing ore comprising the steps of roasting under oxidizing conditions a mixture consisting essentially of vanadium bearing ore and at least one substantially neutral salt of an alkali metal selected from the group consisting of sodium and potassium and a strong mineral acid, mixing an additional quantity of the said alkali metal salt with the roasted ore, roasting the resulting mixture consisting essentially of the roasted ore and the said alkali metal salt under oxidizing conditions, the vanadium bearing ore being roasted in the foregoing roasting steps under oxidizing conditions until vanadium values contained therein are solubilized, leaching the roasted ore with an aqueous medium to produce an aqueous leach liquor containing solubilizide vanadium values, and recovering vanadium values from the leach liquor.

2. The process of claim 1 wherein the vanadium bearing ore is vanadium bearing ferrophosphorus.

3. The process of claim 2 wherein the alkali metal salt is sodium chloride.

4. A process for recovering vanadium values from vanadium bearing ore comprising the steps of roasting under oxidizing conditions a mixture consisting essentially of vanadium bearing ore and at least one substantially neutral salt of an alkali metal selected from the group consisting of sodium and potassium and a strong mineral acid, reducing the particle size of the roasted ore, thereafter subjecting the roasted ore to a second roast under oxidizing conditions in the presence of a quantity of the said alkali metal salt, the vanadium bearing ore being roasted in the foregoing roasting steps under oxidizing conditions until vanadium values contained therein are solubilized, leaching the roasted ore with an aqueous medium to produce an aqueous leach liquor containing solubilized vanadium values, and recovering vanadium values from the leach liquor.

5. The process of claim 4 wherein the vanadium bearing ore is vanadium bearing ferrophosphorus.

6. The process of claim 5 wherein the alkali metal salt is sodium chloride.

7. A process for recovering vanadium values from vanadium bearing ore comprising the steps of roasting under oxidizing conditions a mixture consisting essentially of the vanadium bearing ore and at least one substantially neutral salt of an alkali metal selected from the group consisting of sodium and potassium and a strong mineral acid, adding an additional quantity of the said alkali metal salt to the roasted ore, reducing the particle size of the roasted ore, thereafter subjecting a mixture consisting essentially of the roasted ore and the said alkali metal salt to a second roast under oxidizing conditions, the vanadium bearing ore being roasted in the foregoing roasting steps under oxidizing conditions until vanadium values contained therein are solubilized, leaching the roasted ore with an aqueous medium to produce an aqueous leach liquor containing solubilized vanadium values, and recovering vanadium values from the leach liquor.

8. A process for recovering vanadium values from vanadium bearing ferrophosphorus comprising the steps of roasting under oxidizing conditions in the presence of an elemental oxygen-containing gas a mixture consisting essentially of vanadium bearing ferrophosphorus having a particle size not greater than about −48 mesh and at least one substantially neutral salt of an alkali metal selected from the group consisting of sodium and potassium and a strong mineral acid at a temperature of about 600–750° C., adding an additional quantity of the said alkali metal salt to the roasted ferrophosphorus, reducing the particle size of the roasted ferrophosphorus, thereafter subjecting a mixture consisting essentially of the roasted ferrophosphous and the said alkali metal salt to a second roast under oxidizing conditions in the presence of an elemental oxygen-containing gas at a temperature of about 600–800° C., the ferrophosphorus being roasted in the foregoing roasting steps under oxidizing conditions until vanadium values contained therein are solubilized, leaching the roasted ferrophosphorus with an aqueous medium to produce an aqueous leach liquor containing solubilized vanadium values, and recovering vanadium values from the leach liquor.

9. The process of claim 8 wherein the alkali metal salt is sodium chloride.

10. A process for recovering vanadium values from vanadium bearing ferrophosphorus comprising the steps of roasting under oxidizing conditions in the presence of an elemental oxygen-containing gas a mixture consisting essentially of vanadium bearing ferrophosphorus having a particle size not greater than about −48 mesh and sodium chloride having a particle size not greater than about −8 mesh at a temperature of about 600–750° C., cooling the roasted ferrophosphorus, adding an additional quantity of the sodium chloride to the roasted ferrophosphorus, reducing the particle size of the cooled roasted ferrophosphorus to provide particles having a size not greater than about −3 mesh, thereafter subjecting a mixture consisting essentially of the roasted ferrophosphorus and the sodium chloride to a second roast under oxidizing conditions in the presence of an elemental oxygen-containing gas at a temperature of about 600–800° C., the ferrophosphorus being roasted in the foregoing roasting steps under oxidizing conditions until vanadium values contained therein are solubilized, leaching the roasted ferrophosphorus with an aqueous medium to produce an aqueous leach liquor containing solubilized vanadium values, and recovering vanadium values from the leach liquor.

11. The process of claim 10 wherein the ferrophosphorus is cooled during at least a portion of a roast by addition of water thereto.

12. The process of claim 10 wherein the ferrophosphorus is roasted in the first mentioned roast until when a portion is crushed and leached with water the resulting leach liquor has a pH value of at least 3.3.

13. The process of claim 10 wherein the ferrophosphorus is roasted in the second mentioned roast until when a portion is crushed and leached with water the resulting leach liquor has a pH value of at least 6.5.

14. The process of claim 10 wherein a material providing a substance selected from the group consisting of (a) up to about 0.1 pound of magnesium oxide per pound of ferrophosphorus, and (b) up to about 0.1 pound of calcium oxide per pound of ferrophosphorus is added to the ferrophosphorus prior to at least one of the roasts.

15. The process of claim 10 wherein the ferrophosphorus is roasted in the absence of a substantial amount of added moisture in the gases in contact therewith during at least a portion of a roast.

16. The process of claim 10 wherein the roasted ferrophosphorus from at least one of the roasts is cooled by contacting it with a cooling medium selected from the group consisting of air, steam and sprayed water.

17. The process of claim 10 wherein the ferrophosphorus is roasted in the presence of about 0.35–2 parts by weight of sodium chloride for each part by weight of ferrophosphorus.

18. The process of claim 10 wherein the roasted ferrophosphorus from the second roast is cooled by contacting it with a cooling medium selected from the group consisting of air, steam and sprayed water, and the cooled roasted ferrophosphorus is leached with water to produce a leach liquor containing vanadium values.

19. The process of claim 17 wherein the cooled roasted ferrophosphorus is percolation leached.

20. A process for recovering vanadium values from vanadium bearing ferrophosphorus comprising the steps of roasting under oxidizing conditions in the presence of an elemental oxygen-containing gas a mixture consisting essentially of vanadium bearing ferrophosphorus having a particle size between about −80 mesh and −400 mesh and sodium chloride having a particle size not greater than about −8 mesh at a temperature of about 600–750° C., the sodium chloride being present in an amount up to about 0.6 pound for each pound of ferrophosphorus, the ferrophosphorus being roasted until when a portion is crushed and leached with water the resulting leach liquor has a pH value of at least 5.5, cooling the roasted ore to a temperature not greater than about 500° C. by contacting it with a cooling medium selected from the group consisting of air, steam and sprayed water, adding up to about 0.3 pound of the sodium chloride for each pound of ferrophosphorus to the roasted ferrophosphorus, reducing the particle size of the cooled roasted ferrophosphorus to provide particles having a size not greater than about −3 mesh, thereafter subjecting a mixture consisting essentially of the roasted ferrophosphorus and the sodium chloride to a second roast under oxidizing conditions in the presence of an elemental oxygen-containing gas at a temperature of about 600–800° C., the ferrophosphorus being roasted in the second roast until when a portion is crushed and leached with water the resulting leach liquor has a pH value greater than 7.0, cooling the roasted ferrophosphorus from the second roast to a temperature not greater than about 500° C. by contacting it with a cooling medium selected from the group consisting of air, steam and sprayed water, the ferrophosphorus containing an added material during at least one of the roasts providing a substance selected from the group consisting of (a) up to about 0.1 pound of magnesium oxide per pound of ferrophosphorus and (b) up to about 0.1 pound of calcium oxide per pound of ferrophosphorus, the ferrophosphorus being cooled during at least a portion of a roast by addition of water thereto, leaching the roasted ferrophosphorus with water to produce an aqueous leach liquor containing solubilized vanadium values, and recovering vanadium values from the leach liquor.

References Cited

UNITED STATES PATENTS

| | | | |
|---|---|---|---|
| 1,015,469 | 1/1912 | Bleecker | 23—16 |
| 1,531,541 | 3/1925 | Carpenter | 23—19.1 |
| 2,193,092 | 3/1940 | Frick et al. | 23—19.1 |
| 2,257,978 | 10/1941 | Robertson et al. | 23—19.1 |
| 2,822,240 | 2/1958 | Dunn et al. | 23—140 X |
| 3,206,276 | 9/1965 | Burwell et al. | 23—18 |
| 3,259,455 | 7/1966 | Koerner et al. | 23—15 |

OSCAR R. VERTIZ, *Primary Examiner.*

H. T. CARTER, *Assistant Examiner.*

UNITED STATES PATENT OFFICE

CERTIFICATE OF CORRECTION

Patent No. 3,376,103                          April 2, 1968

Angus V. Henrickson et al.

It is certified that error appears in the above identified patent and that said Letters Patent are hereby corrected as shown below:

Column 4, line 41, "2:1" should read -- 20:1 --; line 44, "thep resent" should read -- the present --. Column 8, line 29, "solubilizide" should read -- solubilized --.

Signed and sealed this 5th day of August 1969.

(SEAL)
Attest:

Edward M. Fletcher, Jr.
Attesting Officer

WILLIAM E. SCHUYLER, JR.
Commissioner of Patents